United States Patent [19]

Huston

[11] Patent Number: 5,577,374
[45] Date of Patent: Nov. 26, 1996

[54] WHEEL MOUNTED STRING TRIMMER

[76] Inventor: Thomas G. Huston, 2420 Robin Rd., Ponca City, Okla. 74604

[21] Appl. No.: 511,534

[22] Filed: Aug. 4, 1995

[51] Int. Cl.⁶ .......................... A01D 34/67; A01D 34/84
[52] U.S. Cl. ............................................. 56/12.1; 56/12.7
[58] Field of Search ...................... 56/12.1, 12.7, 56/17.1, 17.2, 13.6, 13.7, DIG. 18

[56] References Cited

U.S. PATENT DOCUMENTS

| | | | |
|---|---|---|---|
| 4,077,191 | 3/1978 | Pittinger | 56/12.7 |
| 4,212,364 | 7/1980 | Dobberpuhl | 56/17.2 X |
| 4,703,613 | 11/1987 | Raymond | 56/12.7 |
| 4,835,952 | 6/1989 | McLane | 56/17.2 |
| 4,949,534 | 8/1990 | Evans | 56/13.8 X |
| 5,050,372 | 9/1991 | Heiskell | 56/12.7 |
| 5,313,770 | 5/1994 | Smothers | 56/12.7 |

*Primary Examiner*—Terry Lee Melius
*Attorney, Agent, or Firm*—Richard W. Collins

[57] ABSTRACT

A wheel-mounted rotary string trimmer includes an engine mounted on a frame supported by individually adjustable wheels. A handle extending rearwardly from the frame at an adjustable angle provides handle height adjustment. The cutter head angle is adjustable, and the cutter head is offset to one side of the frame and extends forward from the frame.

4 Claims, 4 Drawing Sheets

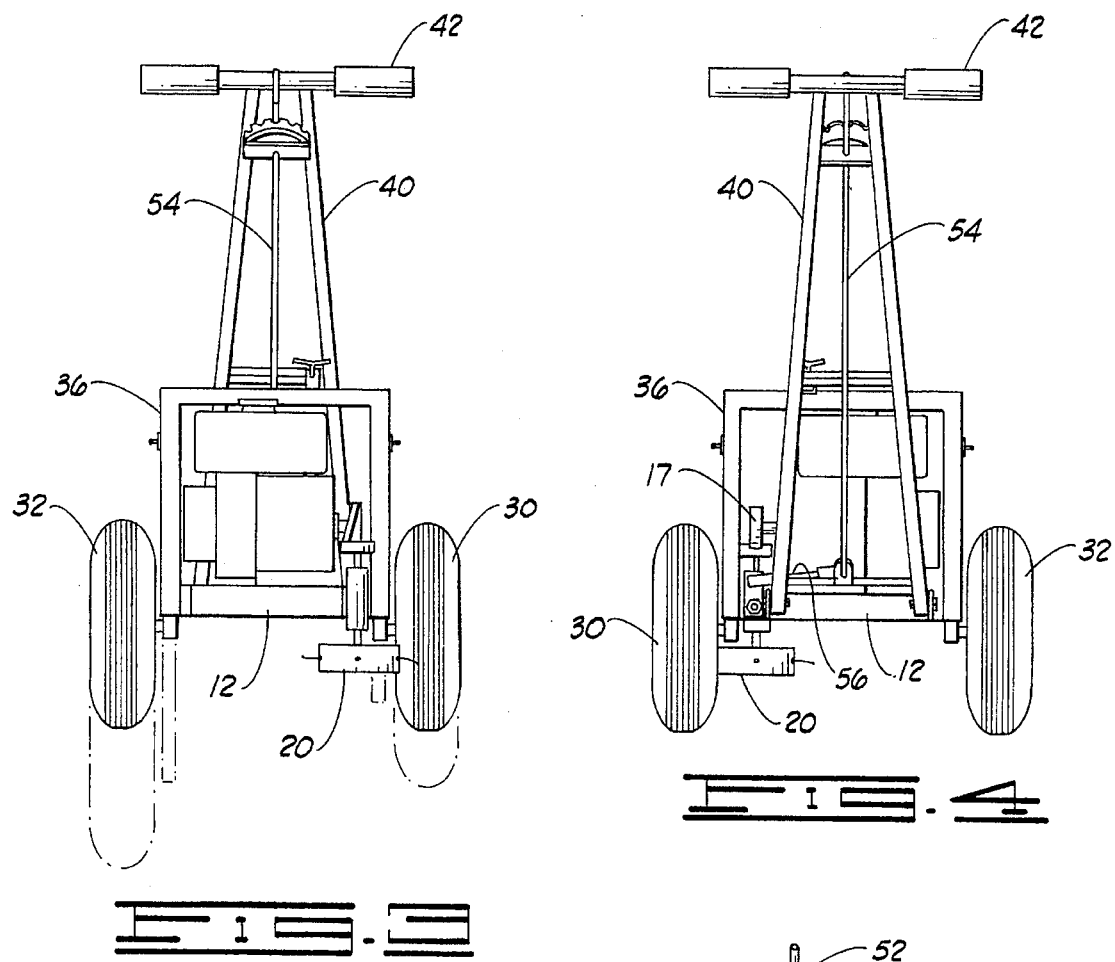
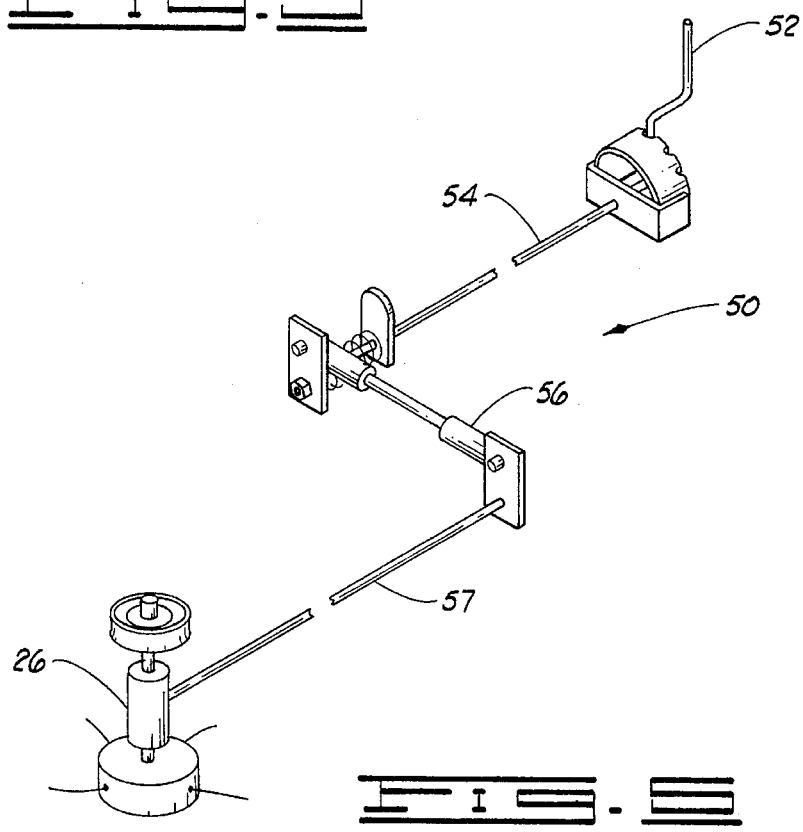

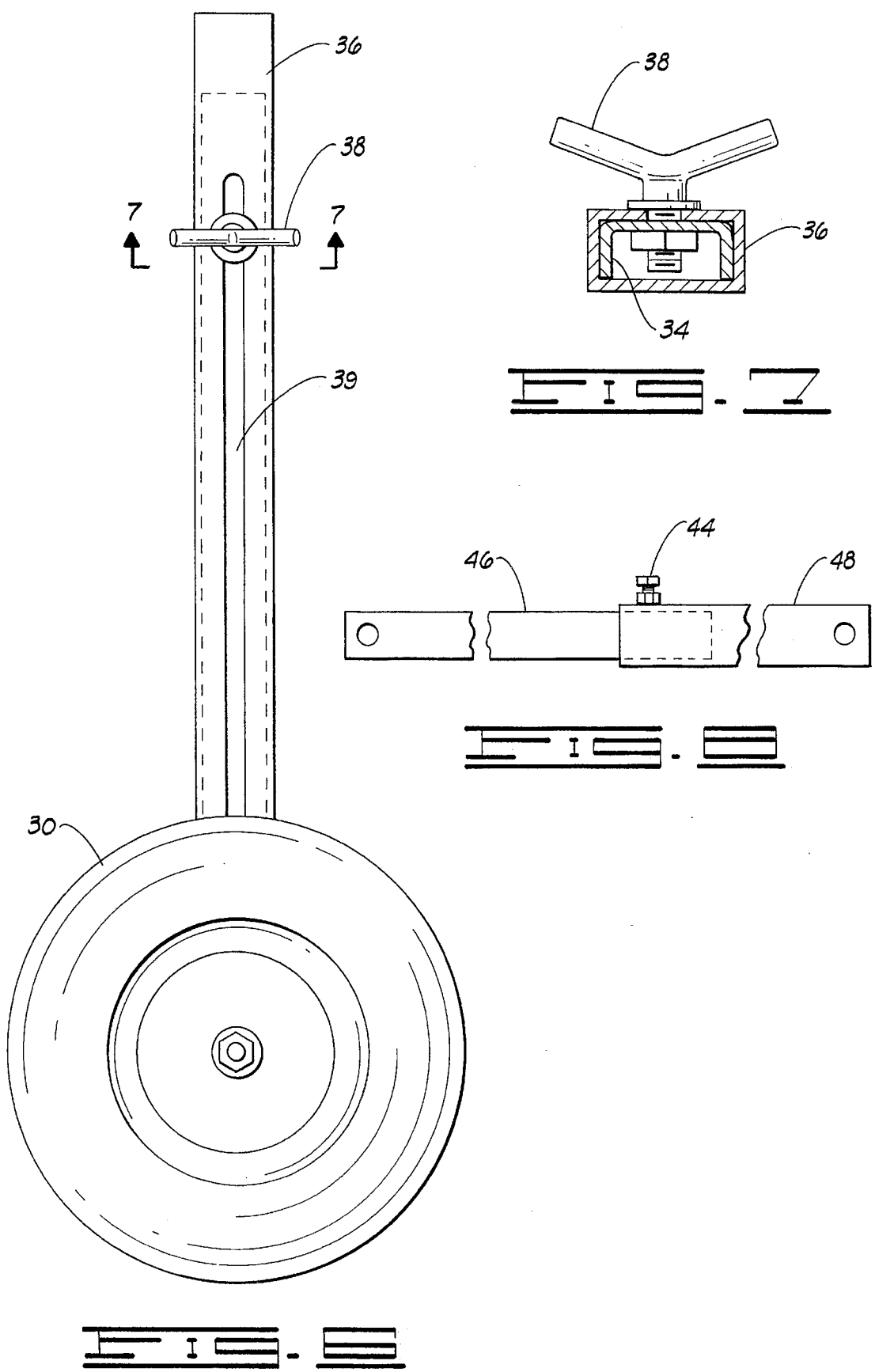

WHEEL MOUNTED STRING TRIMMER

BACKGROUND OF THE INVENTION

1. Field of the Invention

This invention relates to string-type trimmers, and more particularly to heavy-duty, wheel-mounted powered trimmers for severe service such as cemetery maintenance.

2. Background Art

In recent years, powered string trimmers have gained wide acceptance for home and commercial grass and weed control, particularly for edging and trimming along or around walks, curbs, fences, and other obstacles. Most of the currently available string trimmers are hand held units powered by small electric motors or two-cycle gasoline engines. These units have met with considerable success, but have certain drawbacks when used for severe service such as highway or long fence maintenance or for cemetery maintenance. In these uses, the many hours of continuous service present both equipment durability and operator fatigue problems as well as safety problems.

U.S. Pat. No. 4,703,613 to Raymond describes a trimmer with a cutting head that can be tilted and positioned adjacent either wheel. The mechanism for allowing this head movement involves moving both wheels simultaneously relative to the frame by an operator applying torque through the handle.

U.S. Pat. No. 4,077,191 describes a trimmer with a cutter head having a variable position relative to a support mechanism.

U.S. Pat. No. 5,313,770 to Smothers describes a trimmer having a "jam-proof" drive mechanism.

None of the above-noted devices includes a pair of wheels each being independently height adjustable relative to a support frame. Also, none of them suggest use of a centrifugal clutch in the drive train to cause trimmer head rotation only upon reaching a predetermined engine speed. Finally, none of them suggests an adjustable handle angle relative to a frame.

SUMMARY OF THE INVENTION

According to the present invention, an improved trimmer is provided that is rugged, safe and efficient, and which includes many features giving an operator the flexibility to adapt the trimmer to a wide variety of conditions with maximum safety and effectiveness.

DESCRIPTION OF THE DRAWINGS

FIG. 3 is a front elevation showing the adjustable wheel height feature of the invention.

FIG. 4 is a rear elevation.

FIG. 5 is a perspective view showing the mechanism for varying the angle of the cutter head.

FIG. 6 is a side elevation showing the means for adjusting the wheel height relative to the frame.

FIG. 7 is a cross section taken along the line 7—7 of FIG. 6 showing the means for fixing the wheel height on the frame.

FIG. 8 is a side elevation showing a portion of the mechanism for adjusting the handle angle relative to the frame.

DESCRIPTION OF THE PREFERRED EMBODIMENT

Figure 1:
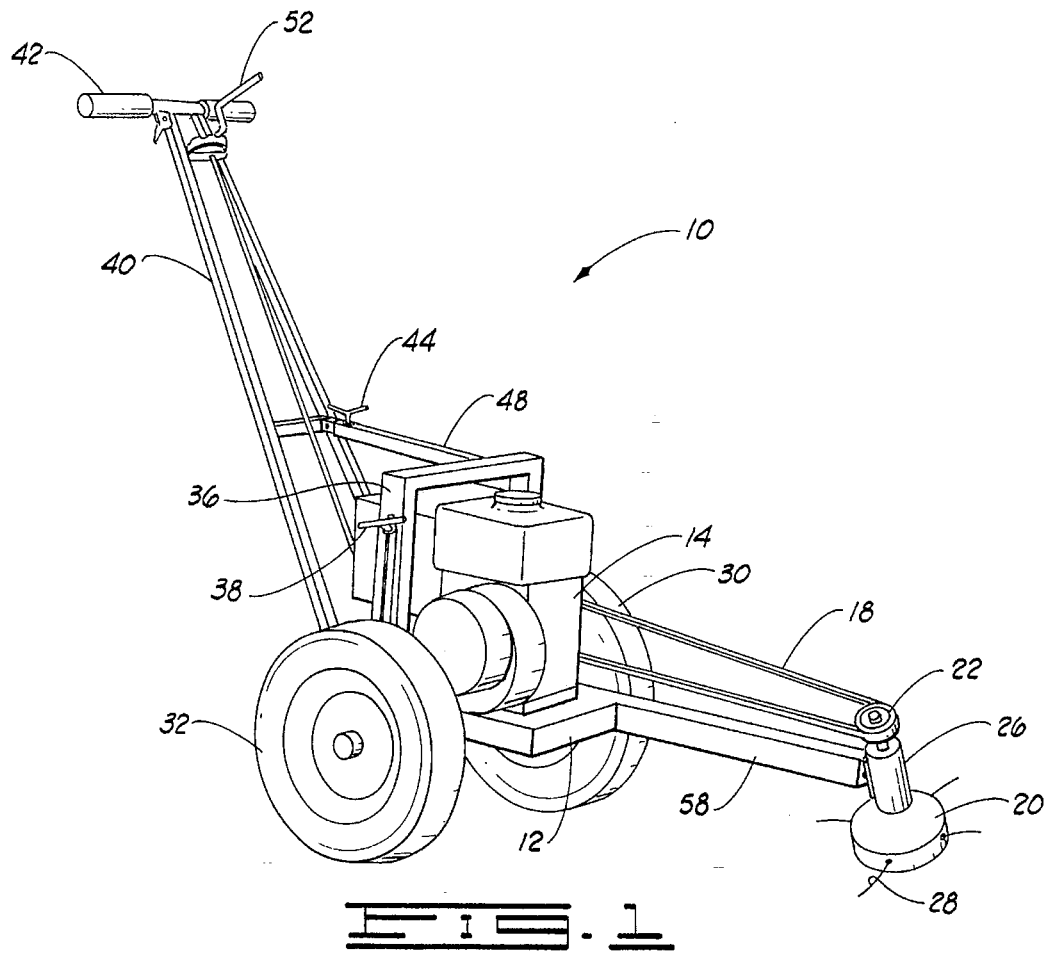
FIG. 1 is a perspective view showing a trimmer in accordance with the invention.
Figure 2:
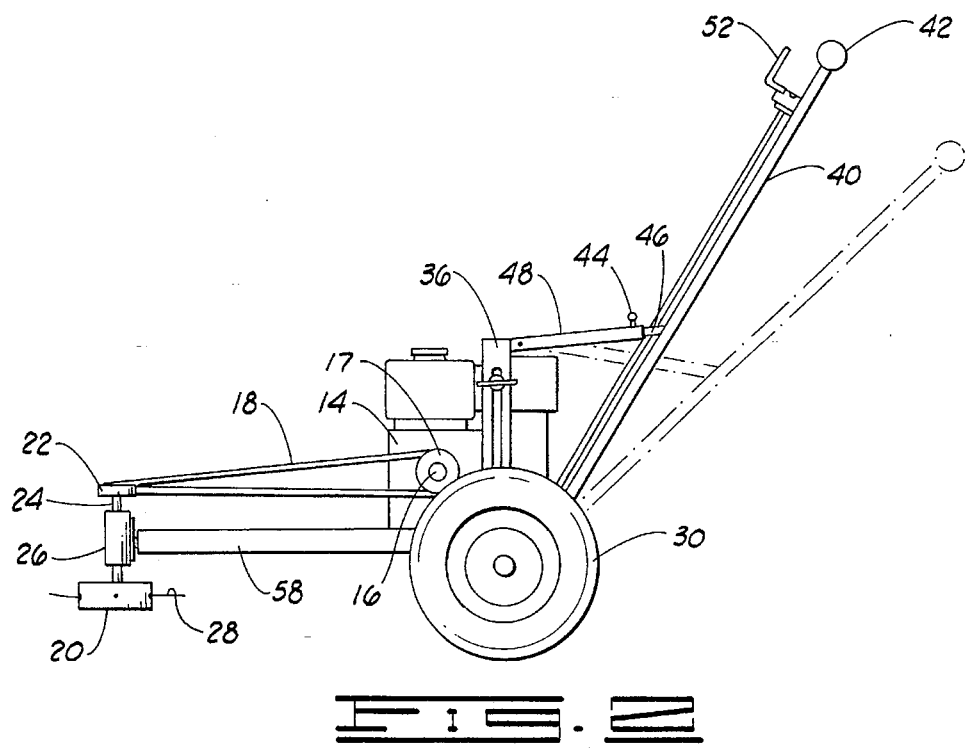
FIG. 2 is a side elevation showing the adjustable handle height feature of the invention.

Referring first to FIGS. 1 and 2, a trimmer is shown generally at 10. Trimmer 10 includes a frame 12 on which an engine 14 is mounted. An output shaft 16 (FIG. 2) acting through centrifugal clutch 17 drives a belt 18 which in turn drives cutter head 20 by rotation of pulley 22 and shaft 24 which is supported by bearing housing 26. Cutting strings 28 extend from cutter head 20.

A pair of wheels 30 and 32 are adjustably attached to frame 12. As best seen in FIG. 3, each wheel is individually adjustable in height relative to frame 12 as shown by the dotted lines for each wheel. The preferred means for providing this adjustment is shown in FIGS. 6 and 7. Wheel 30 is attached to channel member 34 (FIG. 7) which slides inside vertical box member 36 of frame 12. When thumbscrew 38 is loosened, wheel 30 can be moved relative to frame 12 along slot 39 in box member 36 by moving channel member 34 within box member 36. When the wheel is at the desired height, thumbscrew 38 is tightened to fix the wheel position relative to frame 12. The other wheel 32 is similarly adjustable independently on frame 12 as shown in FIG. 3. The independent height adjustment of wheels 30 and 32 allows for operation in various situations including unlevel terrain, curbside cutting and the like.

Referring to FIGS. 2 and 8, a handle 40 is pivotally connected to frame 12, and the height of handlegrips 42 above frame 12 is varied by loosening setscrew 44 which fixes inner tube 46 to outer tube 48 at a desired position. Tubes 46 and 48 are pivotally attached to handle 40 and frame 12 respectively to accommodate the movement illustrated in FIG. 2.

Linkage means to provide adjustment of the cutter head angle is shown in FIGS. 3 and 4, and in detail in FIG. 5. A linkage shown generally at 50 includes adjusting handle 52 which is spring biased in one of a series of detents mounted on handle 40. Rotation of handle 52 in turn rotates shaft 54 which operates through linkage 56 to rotate shaft 57, which is rotatably mounted in frame extension 58 and connected at its outer end to bearing housing 26 which then pivots relative to frame 12 to provide a variable trimmer head angle. Trimmer head 20 is shown in FIG. 1 at an angle relative to frame 12, and in FIGS. 2, 3, and 4, it is shown flat relative to frame 12.

Frame extension 58 extends forwardly from frame 12 on the left side of the device, and preferably the trimmer head rotates clockwise when viewed from above to avoid throwing debris back toward the operator. A shield (not shown) preferably is included over the front of the unit to protect the engine and the operator from flying debris. A protective cover (not shown) preferably is located over the drive belt for safety purposes.

The versatility of the string trimmer is increased by adapting it to receive various rotatable tools in place of cutter head 20. Examples of these alternate rotatable tools are shown in FIGS. 10, 11, 12, and 13.

Figure 9:
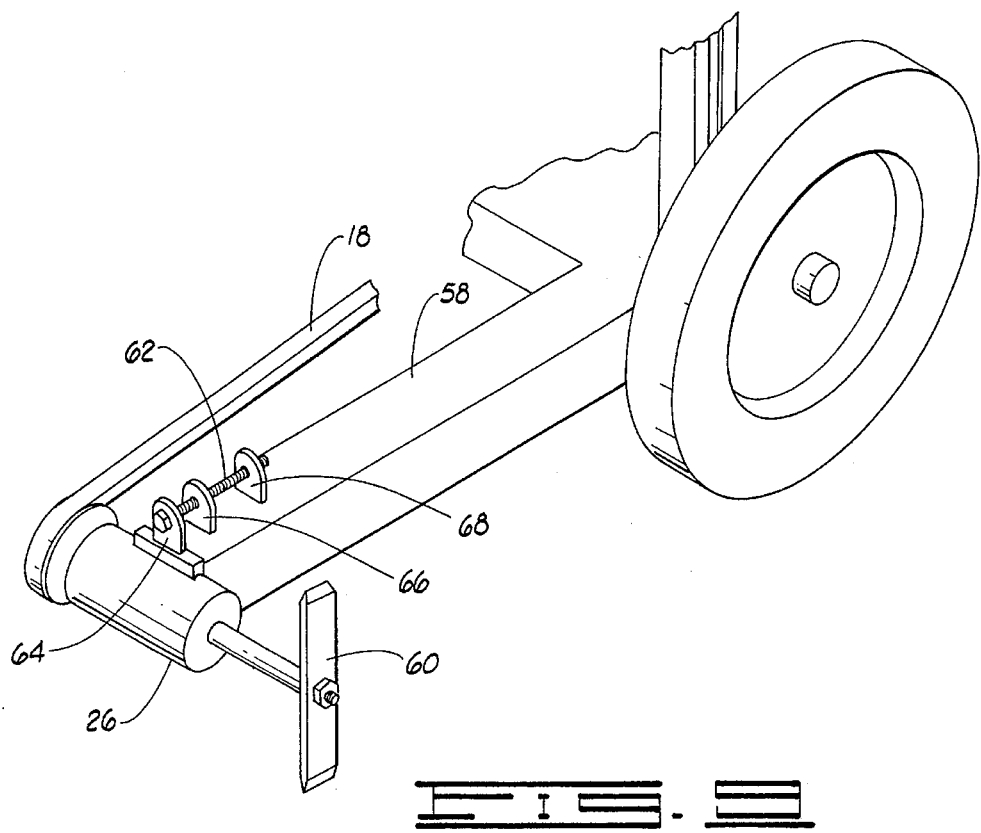
FIG. 9 is a perspective view showing the trimmer modified to use a blade edger.

FIG. 9 shows a metal edger blade 60 in place of the filament cutter head described above. Bearing housing 26 is fixed in position by pin 62 extending through openings in pin receiver 64 affixed to bearing housing 26 and pin receivers 66 and 68 affixed to frame extension 58.

Figures 10, 12:
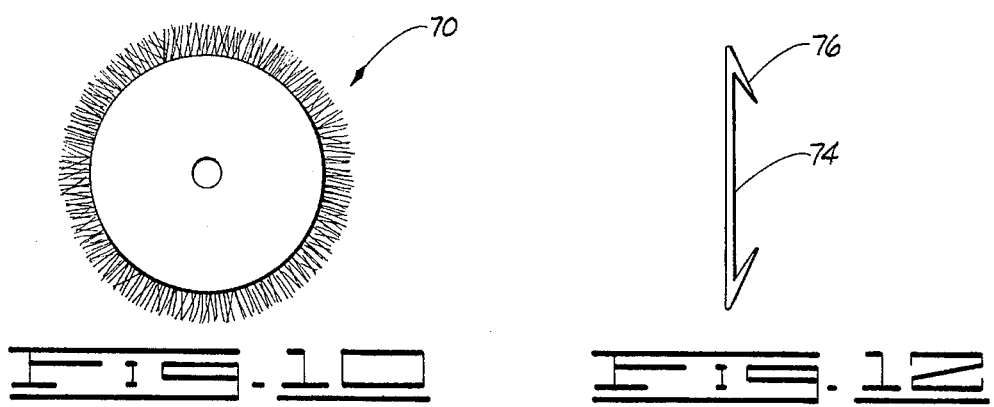
FIG. 10 is a plan view showing a circular wire brush.
FIGS. 12 and 13 illustrate a trench cutting blade.

The circular wire brush 70 shown in FIG. 10 can be mounted in place of blade 60 for cleaning cracks between pavement sections and the like prior to applying sealer to the cracks.

The circular saw blade 72 can be mounted on the apparatus, preferably in a horizontal position, for cutting small trees and the like.

Figures 11, 13:
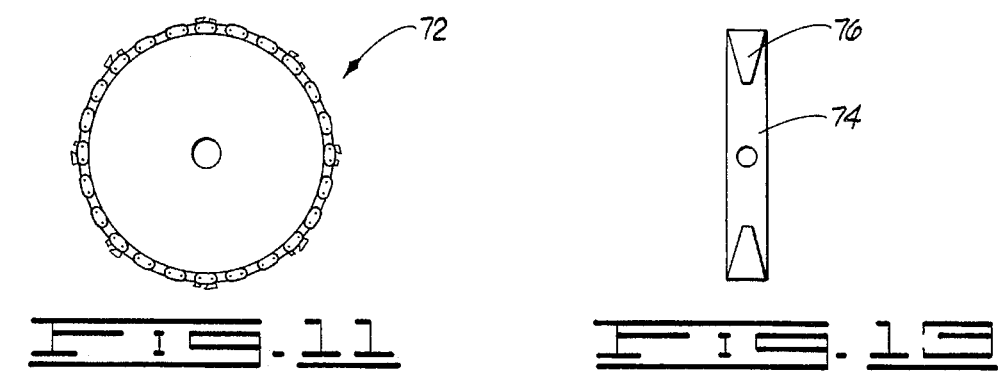
FIG. 11 is a plan view showing a circular saw blade.

FIGS. 12 and 13 show an edger blade 74 including extensions 76 shaped to produce a V-shaped trench for landscaping purposes.

Preferably, bearing housing 26 is pinned to frame 12 when any of the rotatable tools 60, 70 or 74 are used.

OPERATION

The operation of the trimmer will be described in the context of cemetery maintenance, which is one of its primary uses.

Engine 14 is started, either by a pull rope or electric starter, and set to run at a low RPM such that centrifugal clutch 17 does not engage, and cutter head 20 does not rotate. Wheels 30 and 32 are individually adjusted to accommodate the specific cutting job, and handle 40 is positioned to suit the operator. The angle of cutter head 20 is set to suit the particular cutting job, and the unit is moved into position for trimming, for example, a row of rectangular grave markers. The cutter head is positioned along one length of a marker, and the engine speed is increased to engage clutch 17 and turn cutter head 20. After trimming along the length of the marker, the unit is rotated to the left to trim an adjacent side of the marker. The unit is then moved to the next marker and the procedure is repeated. At the end of a row of markers, the operator turns the unit around and trims the other length and side of each of the markers.

The vertical adjustability of each wheel and the variable cutter head angle enable the operator to handle a variety of situations, including curbs, fence rows on sloping terrain, and obstacle clearance. During movement of the unit from one cutting situation to another, the engine speed can be reduced, such as by a handle-mounted throttle, to avoid unwanted cutting and debris. As will be apparent, cutting head angle, wheel height, and handle height can be readily changed as the cutting proceeds, providing maximum flexibility and efficiency.

The foregoing description of the preferred embodiment is intended to be illustrative of the invention, which is defined by the appended claims.

I claim:

1. A rotary string trimmer comprising:
   (a) an engine mounted on a frame;
   (b) a pair of wheels attached to said frame, each of said wheels being independently adjustable in height relative to said frame;
   (c) a cutter head positioned forwardly of the left side of said frame and supported by a forwardly extending frame extension which is rigidly affixed to said frame, said cutter head being adjustable from a flat position to an angled position by virtue of a linkage including a rotatable shaft extending through said frame extension, said cutter head being adapted, when in a flat position, to rotate in a clockwise direction as viewed from above;
   (d) drive means extending from an output shaft of said engine to said cutter head, said drive means including a centrifugal clutch adapted to engage said cutter head at a predetermined engine speed; and
   (e) handle means extending rearwardly from said frame, the angle of said handle means relative to said frame being adjustable by selective fixed positioning of said handle relative to said frame.

2. A wheel-mounted apparatus comprising:
   (a) an engine mounted on a frame;
   (b) a pair of wheels attached to said frame, each of said wheels being independently vertically adjustable relative to said frame;
   (c) a rotatable work tool positioned forwardly of said frame and supported by a forwardly extending frame extension which is rigidly affixed to said frame, said work tool being adjustable from a flat position to an angled position by virtue of a linkage including a rotatable shaft extending through said frame extension;
   (d) drive means extending from an output shaft of said engine to said work tool, said drive means including a centrifugal clutch adapted to engage said work tool at a predetermined engine speed; and
   (e) handle means extending rearwardly from said frame, the angle of said handle means relative to said frame being adjustable by selective fixed positioning of said handle relative to said frame.

3. The apparatus of claim 2 wherein said rotatable work tool is a metal cutting blade, and said work tool is fixed in a cutting position by pin means secured to said frame.

4. The apparatus of claim 2 wherein said rotatable work tool is a circular wire brush.

* * * * *